(12) United States Patent
Alexander

(10) Patent No.: US 6,239,959 B1
(45) Date of Patent: May 29, 2001

(54) GROUND DISTANCE RELAY FOR AC POWER TRANSMISSION LINE PROTECTION

(75) Inventor: George E. Alexander, Wallingford, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/343,466

(22) Filed: Jun. 30, 1999

(51) Int. Cl.⁷ ........................................................ H02H 3/18
(52) U.S. Cl. ................................................ 361/85; 361/80
(58) Field of Search ..................... 361/42, 47, 65, 361/80, 82, 85, 86, 87, 115

(56) References Cited

U.S. PATENT DOCUMENTS

| | | | |
|---|---|---|---|
| 4,686,601 | * 8/1987 | Alexander et al. | 361/80 |
| 4,706,156 | 11/1987 | Caunce | 361/80 |
| 4,745,512 | 5/1988 | Hampson | 361/36 |
| 4,819,119 | 4/1989 | Wilkinson | 361/76 |
| 4,821,137 | * 4/1989 | Wilkinson | 361/80 |
| 4,823,226 | 4/1989 | Reed et al. | 361/85 |
| 4,825,323 | 4/1989 | Wilkinson | 361/65 |
| 4,825,326 | 4/1989 | Andow et al. | 361/63 |
| 4,825,327 | 4/1989 | Alexander et al. | 361/82 |
| 4,868,704 | 9/1989 | Cavero | 361/80 |
| 4,878,142 | * 10/1989 | Bergman et al. | 361/80 |
| 4,996,624 | 2/1991 | Schweitzer, III | 361/63 |
| 5,140,492 | 8/1992 | Schweitzer, III | 361/80 |
| 5,365,396 | 11/1994 | Roberts et al. | 361/80 |

OTHER PUBLICATIONS

"Advanced Line Protection System with Single Phase Tripping", GEK 105556, GE Power Management, Malvern, PA., No Date.
"DLP—Digital Line Protection", GET–8037A, GE Protection and Control Business Department, Malvern, PA., No Date.

* cited by examiner

Primary Examiner—Ronald W. Leja
(74) Attorney, Agent, or Firm—Carl B. Horton; Thomas M. Blasey; Hunton & Williams

(57) ABSTRACT

An improved reactance characteristic for an overall ground distance quadrilateral characteristic embodies a particular phase selector, possibly among a plurality of phase selectors and variables, that eliminates undesirable generation of a tripping signal other than only for a selected phase to ground fault. This phase selector is $I_{1F}Z_1$, where $Z_1$ is the positive sequence replica impedance and $I_{1F}$ is the fault component of the positive sequence current component, referenced to the proper phase. Preferably, the pre-fault load current is removed from this quantity. Additionally, an improved restricted phase directional function is implemented, further improving the overall performance of the quadrilateral characteristic relay.

34 Claims, 6 Drawing Sheets

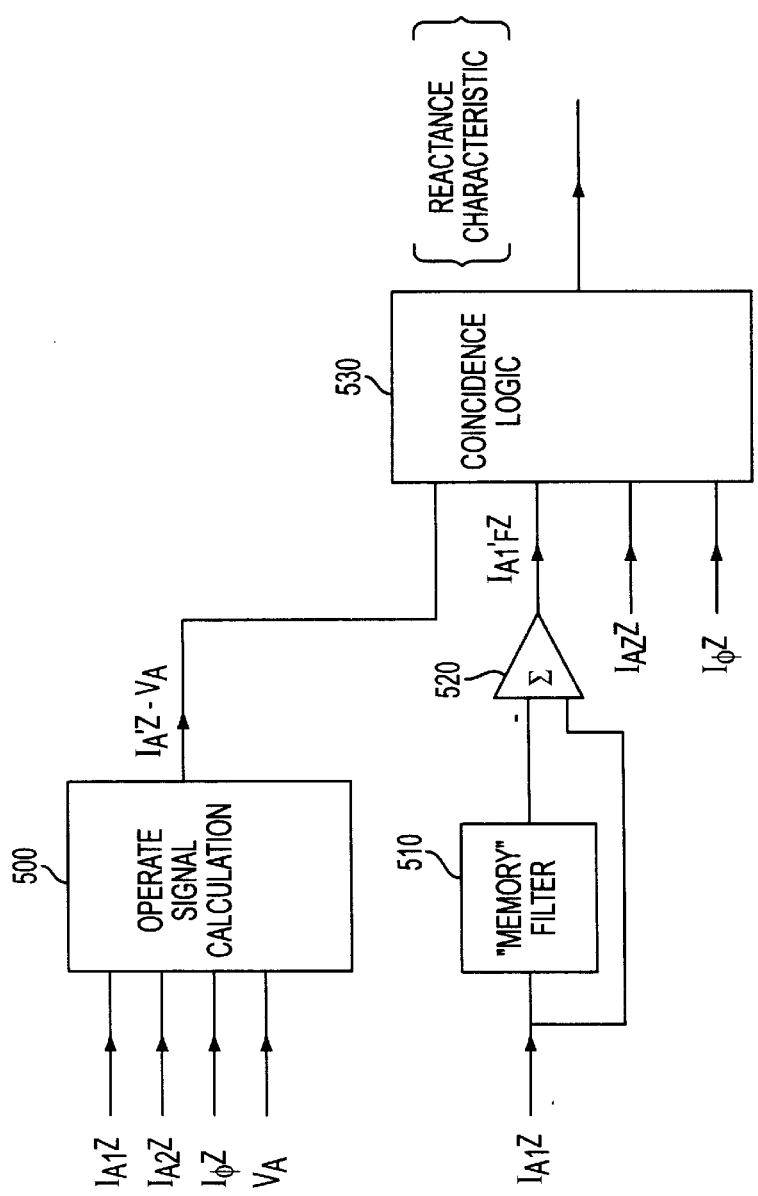
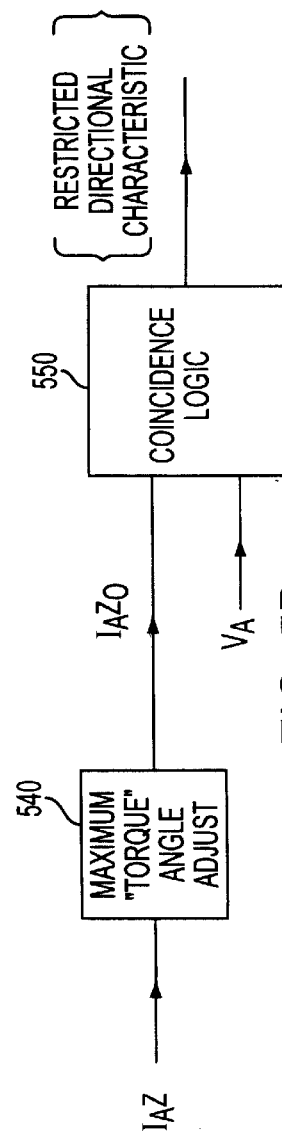
FIG. 5A
FIG. 5B

GROUND DISTANCE RELAY FOR AC POWER TRANSMISSION LINE PROTECTION

BACKGROUND OF THE INVENTION

The present invention is directed to electric power transmission system protection apparatus and, more particularly, to an improved quadrilateral characteristic for a ground distance relay.

Electric power transmission systems frequently employ so-called distance relays to determine whether a fault on the system is within a predetermined distance of a monitoring point where the relay is located. Each predetermined distance is often referred to as a separately numbered zone. The present invention is particularly concerned with distance relays which respond to single phase to ground faults within zone 1, a separate such relay being normally provided for each phase of the polyphase power transmission system.

In a well-known form of a distance relay a tripping signal determination is made by comparing the phases of voltages derived from measurements of the system voltage and current at the monitoring point under fault conditions. For example, referring to FIG. 1, in the so-called mho characteristic relay of the prior art the phases of quantities V-IZ and $V_{pol}$ are compared where:

V is the phase voltage at the monitoring point;

I is the phase current at the monitoring point;

Z is a replica impedance which determines the setting of the relay, i.e., the predetermined distance or reach; and $V_{pol}$ is $V\angle-90°$.

Since the quantities V-IZ and V are necessarily at 90°, and hence the quantities V-IZ and $V_{pol}$ are necessarily in phase when the meeting point of the vectors V and V-IZ lies on a circle having IZ as diameter, by determining, using a phase comparator, whether V-IZ leads or lags $V_{pol}$ it can be determined whether the fault is beyond or within the distance for which the tip of the vector V lies on the circle.

In addition to the capability of discriminating with respect to distance, it is highly desirable that not all faults or fault combinations within a prescribed distance or zone necessarily lead to the tripping of a breaker. For example, a ground distance relay for phase A preferably should detect phase A-to-ground faults only, not phase B-to-ground faults, or, alternatively, phase-to-phase faults. In other words, it is generally desirable that the relays implemented in an AC power distribution system have a certain degree of discrimination not only with respect to distance, but also with respect to particular fault combinations.

An early attempt to provide a more discriminating ground distance relay is disclosed in U.S. Pat. No. 4,686,601 to the present inventor. That patent discloses a system for improved discrimination between internal and external faults as well as prevention of overreaching by the ground distance relay on single line-to-ground and double line-to-ground faults. That patent further discloses a system to prevent operation of the ground distance relay on a phase other than the phase on which a fault occurs.

U.S. Pat. No. 4,686,601 is based on a mho type characteristic like that discussed above and shown in FIG. 1. However, many protective relay engineers prefer to use a quadrilateral (polygonal) characteristic for ground distance functions to provide more fault resistance coverage than the circular mho characteristic. Further, the system disclosed in U.S. Pat. No. 4,686,601 is not particularly sensitive to preventing the relay function from responding to faults other than single line-to-ground faults on the protected phase. In other words, such a system may respond to any other single line-to-ground fault or any fault that involves more than one phase. Such undesirable relay functions lead to unnecessary tripping of breakers which leads to unnecessary electrical transmission interruptions.

SUMMARY OF THE INVENTION

It is therefore seen as desirable to provide an improved quadrilateral characteristic ground distance relay that is able to provide improved discrimination especially with respect to double line to ground faults.

In accordance with an embodiment of the invention there is provided an improved reactance characteristic that embodies a particular phase selector that eliminates undesirable generation of a tripping signal other than for a selected phase to ground fault. This particular phase selector is $I_{1F}Z_1$, where $Z_1$ is the positive sequence replica impedance and $I_{1F}$ is the fault component of the positive sequence current component, referenced to the proper phase. Preferably, the pre-fault load current is removed from this quantity via a memory function.

Further in accordance with the preferred embodiment of the present invention, an improved restricted phase directional function is implemented, providing improved overall relay performance. A right resistive blinder function is also provided to complete the component set for the quadrilateral characteristic.

BRIEF DESCRIPTION OF THE DRAWINGS

FIGS. 4–7 depict a preferred arrangement to achieve the quadrilateral characteristic in accordance with a preferred embodiment of the present invention.

DETAILED DESCRIPTION

Figure 1:
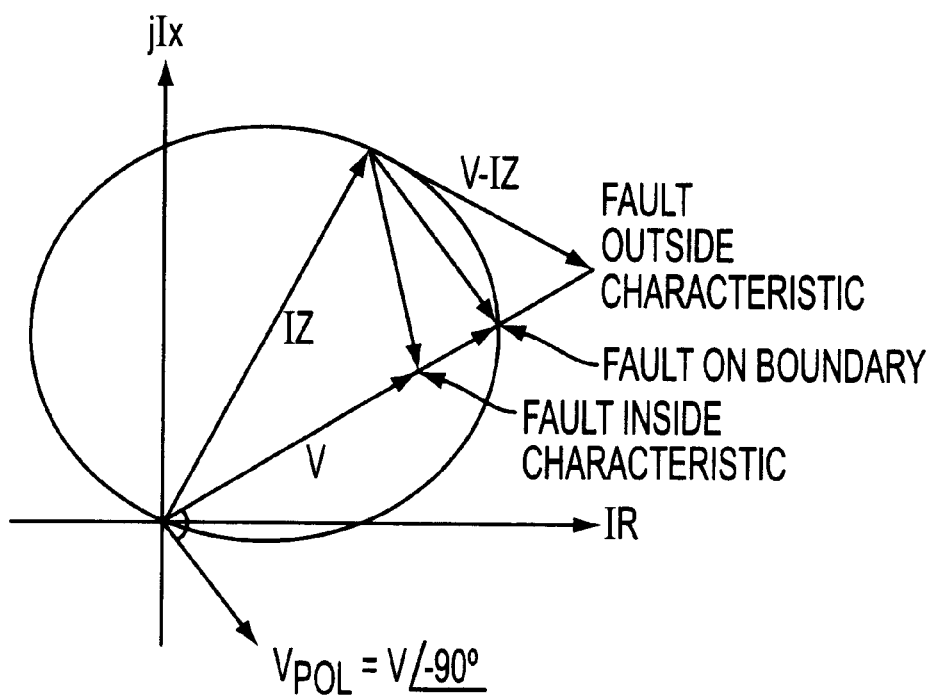
FIG. 1 shows a prior art circular mho type characteristic for a ground distance relay.
Figure 2:
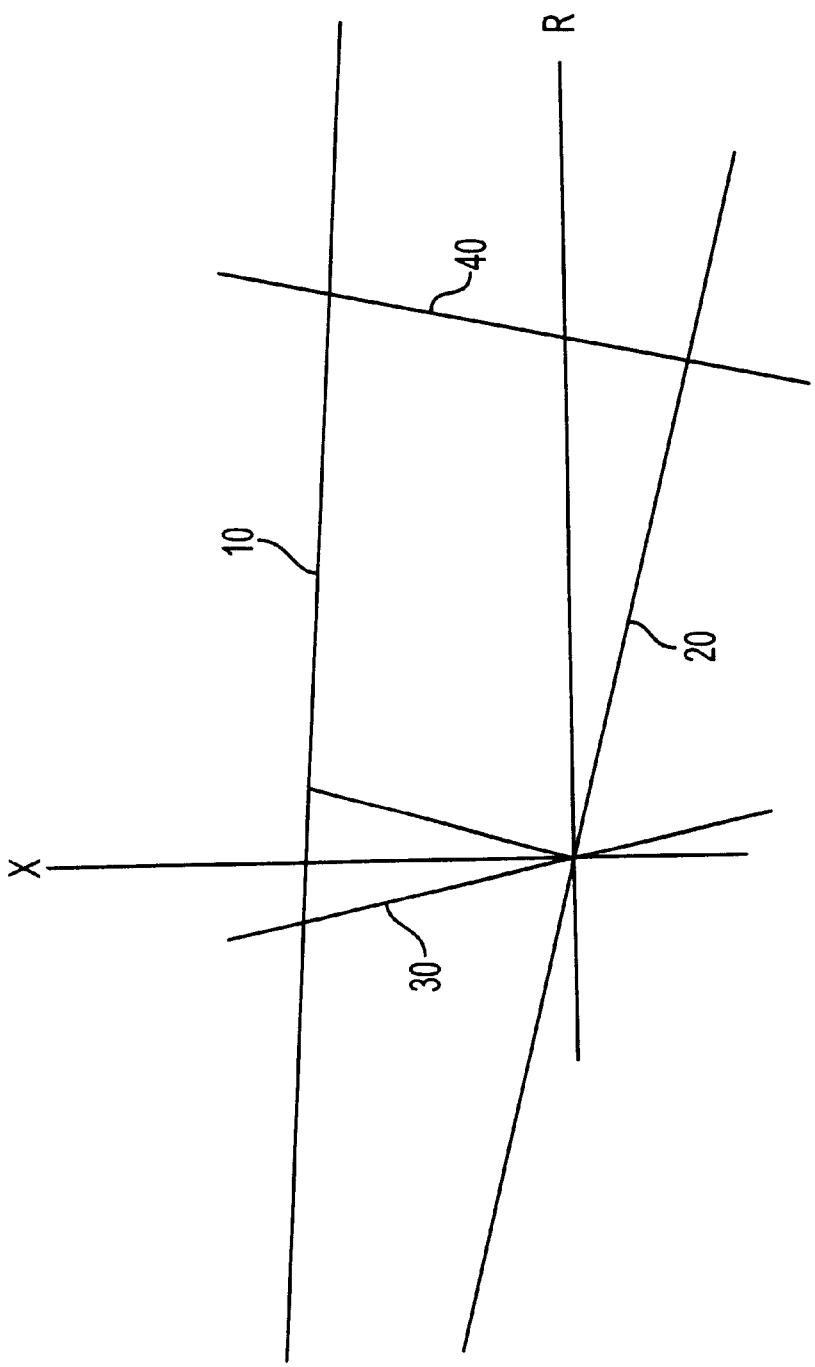
FIG. 2 shows a conventional quadrilateral characteristic.

As noted, many protective relay engineers prefer to use a quadrilateral (polygonal) characteristic for ground distance functions to provide more fault resistance coverage than the conventional circular mho characteristic. A typical quadrilateral characteristic is shown in FIG. 2. The characteristic is comprised of four straight lines and the trip zone is defined as the inside area bounded by these lines. The upper boundary, the reactance characteristic 10, may also be used with a variable mho fiction, a fiction known by one of ordinary skill. The variable mho provides both directional supervision for reverse faults, and resistive limits to prevent operation on load.

Generally, the four straight lines of any quadrilateral characteristic may be developed by a combination of the following three characteristics: reactance characteristic 10, restricted directional characteristic 20 and 30, and right (positive) resistive blinder 40, as shown in FIG. 2.

Quadrilateral functions used for zone 1 preferably are designed with minimum transient over-reach; the transient over-reach of the over-reaching zones, i.e., zones 2 or 3, is not critical. It has been a well documented problem that the ground reactance characteristic is subject to misoperations (over reach) on double line to ground faults. The improved reactance characteristic described herein, however, incorporates a particular phase selector which effectively eliminates these problems. In addition, a new restricted phase directional function is implemented, as is a right resistive blinder, as discussed in detail below.

The following definitions pertain to all of the distance functions:

$I_A$=phase A current at relay
$I_B$=phase B current at relay
$I_C$=phase C current at relay
$I_0$=zero-sequence current at relay
$V_A$=phase A to ground voltage at relay
$V_B$=phase B to ground voltage at relay
$V_C$=phase C to ground voltage at relay
$X_1$=positive-sequence component of X
$X_2$=negative-sequence component of X
$X_M$=memory (pre-fault) value of X
$Zx_1$=zone x pos.-seq. reach setting—ZxR∠ POSANG
$Zx_0$=zone x zero-seq. reach setting—ZxR∠ ZERANG Note: The magnitudes of $Zx_1$ and $Zx_0$ are identical-these quantities differ in phase angle only.

Figure 3:
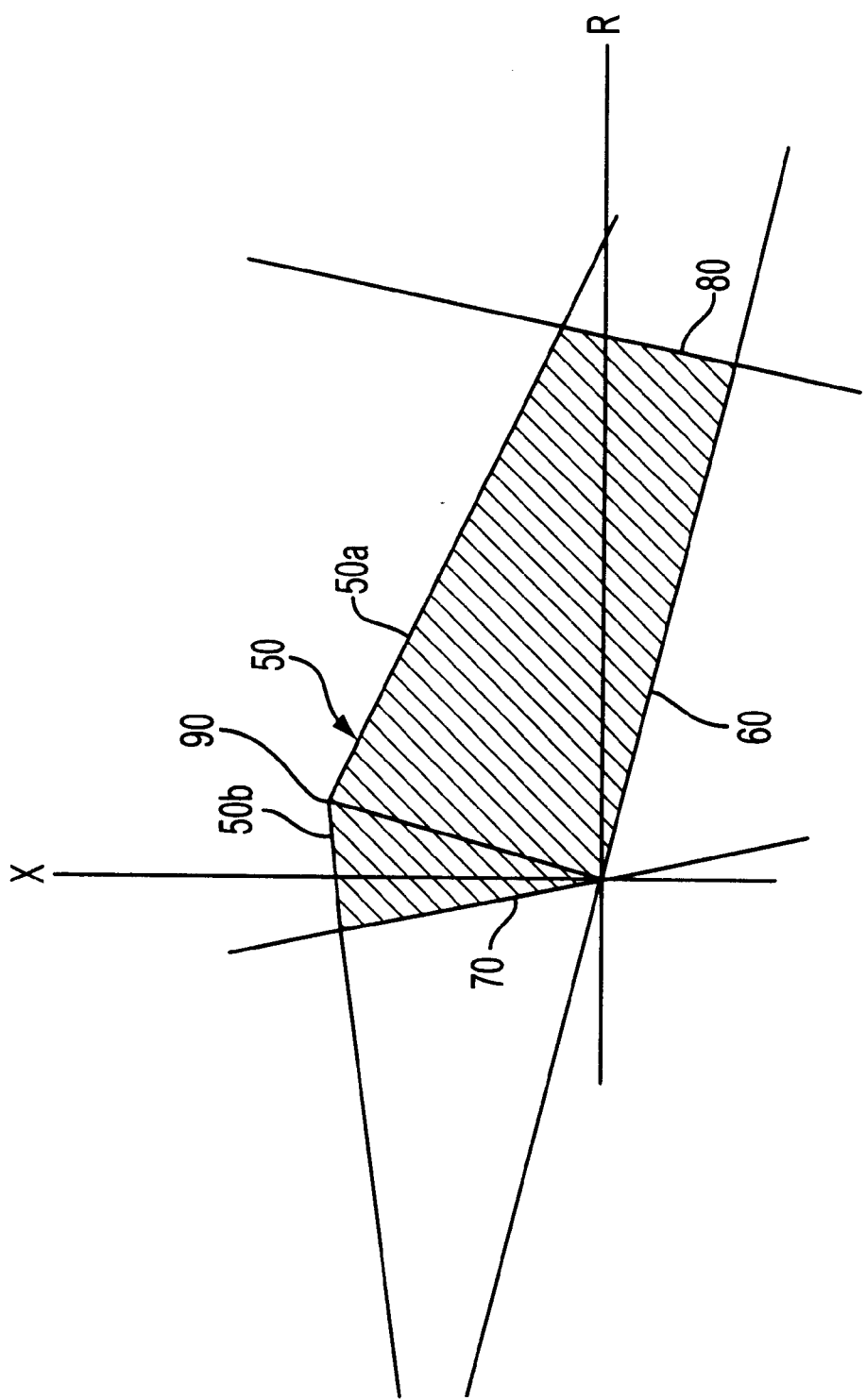
FIG. 3 shows a quadrilateral characteristic with a reactance characteristic having a "tent" portion in accordance with a preferred embodiment of the present invention.

$K_01$=zone 1 zero-sequence compensation factor-Z1K0
$K_0$=zero-sequence compensation factor Reactance Characteristic Referring now to FIG. 3, the reactance characteristic 50 proposed for the ground quadrilateral characteristic according to a preferred embodiment of the present invention is based on a negative/zero sequence phase angle comparator reactance characteristic. Prior art relays such as the Digital Line Protection (DLP) (GE technical publication GET-8037A) and Advanced Line Protection System (ALPS) (GE technical publication GEK-105556) lines of relays designed and manufactured by the assignee of the present invention, implement such a negative/zero sequence phase angle comparator reactance characteristic and, accordingly, a detailed discussion thereof is omitted here. In accordance with a preferred embodiment of the present invention, the reactance characteristic function 50 is generated preferably by a total of four comparator inputs. Specifically, the operate and polarizing signals used in this function are:

| Operate: | $I\Phi'Z - V\Phi$ |
|---|---|
| Pol. #1: | $I_0 Z_1$ |
| Pol. #2: | $I_2 Z_1$ |
| Pol. #3: | $I_{1F} Z_1$ |

Where:
$I_\phi'Z$ is the compensated IZ product,
$Z_1$ is the positive sequence replica impedance,
$V_\phi$ is the phase to ground voltage,
$I_0$ is the zero sequence current component,
$I_2$ is the negative sequence current component, referenced to the proper phase,
and
$I_{1F}$ is the fault component of the positive sequence current component, referenced to the proper phase. The pre-fault load current is removed from this quantity.

All zones of ground reactance characteristics preferably have a phase angle discriminator (which functions as a characteristic timer in an analogous analog implementation) with a pickup range of 90 to 155 degrees in 1 degree steps. The characteristic timer setting preferably is used to "tilt" the reactance characteristic 50, thereby modifying the characteristic to look like a tent, to prevent over-reach on non-homogeneous systems, as shown in FIG. 3. Specifically, by selecting the combination of inputs as set forth above for the reactance characteristic 50, not only does a part 50a of the reactance line 50 tilt down to the right, but a part 50b also tilts down to the left of the maximum reach balance point 90, whereby a tent-like characteristic results. By adjusting the angle of the phase angle comparator rather than the angle of "maximum torque," the transient over reach is not increased. The $K_0$ setting of zone 1 preferably is independent of the $K_0$ setting for the over-reaching zones.

Thus, for a zone 1 ground function, the signals preferably provided to the comparator for each phase of a three phase system are:

| Phase A: | $(I_A - I_0) \cdot Z1_1 + K_01 \cdot Z1_0 - V_A$ |
|---|---|
| | $I_{A2} \cdot Z1_1$ |
| | $I_0 \cdot Z1_1$ |
| | $I_{A1F} \cdot Z1_1$ |
| Phase B: | $(I_B - I_0) \cdot Z1_1 + K_01 \cdot I_0 \cdot Z1_0 - 0 V_B$ |
| | $I_{B2} \cdot Z1_1$ |
| | $I_0 \cdot z11$ |
| | $I_{B1F} \cdot Z1_1$ |
| Phase C: | $(I_C - I_0) \cdot Z1_1 - K_01 \cdot I_0 \cdot Z1_0 - V_C$ |
| | $I_{C2} \cdot Z1_1$ |
| | $I_0 \cdot Z1_1$ |
| | $I_{C1F} \cdot Z1_1$ |

Restricted Directional Characteristic

The restricted directional characteristic 60, 70 of the preferred ground quadrilateral, as shown in FIG. 3, preferably has a separate directional unit for each phase. Further in accordance with the preferred embodiment, no user settings, such as "maximum torque angle," are proposed for this characteristic, but under the appropriate circumstances, may be implemented. A separate directional unit is required for implementation in any reverse zones. Thus, the input signals to the comparator are:

| Phase A: | $I_A \cdot ZD$ |
|---|---|
| | $V_A$ |
| Phase B: | $I_B \cdot ZD$ |
| | $V_B$ |
| Phase C: | $I_C \cdot ZD$ |
| | $V_C$. |

The term $I_A \cdot ZD$ is developed in the same manner as the $I_A Z_1$ term, but the phase angle ("maximum torque angle") is fixed at 65 degrees rather than being set equal to the angle of the positive sequence impedance of the line.

The characteristic timer angle preferably is fixed at 115 degrees. That is, the function preferably operates when the input signals are within +/−65 degrees of each other.

Note that if the magnitude of the faulted phase voltage is too low (as for a close-in zone 1 fault), the phase directional function will not operate. This might also occur for a remote fault when the relay is located near a strong source. Therefore, if the phase voltage is less than a minimum threshold voltage, e.g., 7% of rated voltage, then the positive sequence memory voltage from the ground mho functions is used in place of the phase voltage to polarize the directional function.

Right Resistive Blinder

The right resistive blinder 80 shown in FIG. 3 preferably is designed as a two input phase angle comparator. The input signals for the comparator preferably are:

Operate: $I_\phi' \cdot RB1 - V_\phi$

Polarize: $I_\phi' \cdot B1$ where the magnitude of RBl (Right Blinder for zone 1) is the point at which the characteristic intersects the R axis of the R-X diagram. The range of adjustment preferably is 0.1 to 500.0 ohms in 0.1 ohm steps.

The angle of RB1 preferably is fixed based on the positive sequence line angle (POSANG), the zero sequence line angle (ZERANG), and the zero-sequence compensation factor (K0). Specifically, the angle preferably is:

$$\frac{2 \cdot POSANG + K0 \cdot ZERANG}{2 + K0}.$$

This sets the angle of the right resistive blinder 80 the same as the protected or monitored line angle. In order to achieve this, the angle of the IZ term from the reactance characteristic is shifted by −90°.

Note that $I_\phi'$ is the compensated phase current, $(I_A - I_0) + K_0 1 \cdot I_0$, and that $K_0 1$ is a vector with an angle equal to (ZERANG−POSANG). The characteristic timer angle preferably is fixed at 90 degrees.

Thus, for the zone 1 ground fiction, the desired operate and polarizing signals are:

| Phase A: | $I_{A'} \cdot RB1 - V_A$ |
|---|---|
| | $I_{A'} \cdot RB1$ |
| Phase B: | $I_{B'} \cdot RB1 - V_B$ |
| | $I_{B'} \cdot RB1$ |
| Phase C: | $I_{C'} \cdot RB1 - V_C$ |
| | $I_{C'} \cdot RB1$ |

Where:

$I_A' = (I_A - I_0) + K_0 1 \cdot I_0$ $I_B' = (I_B - I_0) + K_0 1 \cdot I_0$ $I_C' = (I_C - I_0) + K_0 1 \cdot I_0$ $K_0 1 = |K_0 1| < (ZERANG - POSANG)$.

FIGS. 4–7 depict a preferred arrangement for achieving the ground distance quadrilateral fiction of the preferred embodiment. As shown, a polyphase system 400 includes phases A, B and C. Voltage transformers 402, 404, 406 and current transformers 408, 410, 412 provide signals representative of the respective line voltages and currents to anti-aliasing filters and A–D converters 420. While the present embodiment preferably is implemented digitally, an analog implementation is also possible. From the anti-aliasing filters and A-D convertor 420, the various variables that are subsequently used as inputs for the individual segments of the quadrilateral function are obtained directly or via voltage sequence components block 422, reach multiplier and mimic algorithm block 426 or current sequence components block 424.

Referring now to FIGS. 5A and 5B, which depict calculations for phase A (although the circuitry shown is equally applicable to any of the phases of the polyphase system), inputs to the operate signal calculation 500 for the reactance characteristic are $I_{A1}Z$, $I_{A2}Z$, $I_\phi$ and $V_A$, which calculation results in the term $I_A' - V_A$. This term is fed to coincidence logic 530 along with the following polarizing signals: $I_{A1F}Z$ (derived via $I_{A1}Z$, pre-fault "memory" filter 510 and summing function 520), $I_{A2}Z$ and $I_\phi Z$. The output of the coincidence logic 530 provides an indication of whether the reactance characteristic is in an "operate" condition.

The restricted directional characteristic is obtained by passing the term $I_A Z$ through maximum "torque" angle adjust block 540 and proving the inputs $I_A ZD$ and $V_A$ to coincidence logic block 550.

Figure 6:
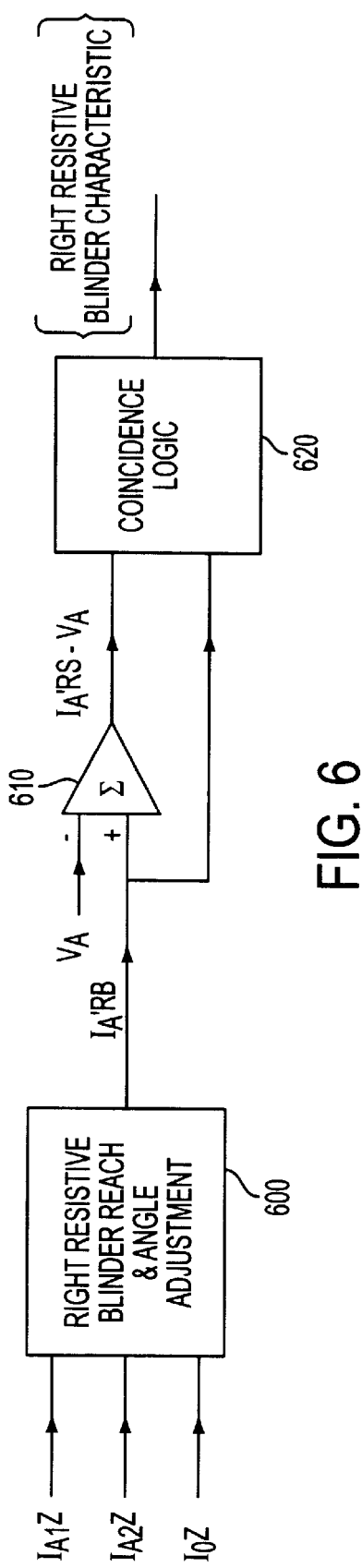

FIG. 6 depicts exemplary circuitry for obtaining the right resistive blinder characteristic and the ultimate quadrilateral output for a phase A to ground fault. Specifically, terms $I_{A1}Z$, $I_{A2}Z$ and $I_0 Z$ are fed into right resistive blinder reach and angle adjustment block 600 to obtain the term $I_A' RB$, which itself is fed into summing block 610 wherein $V_A$ is subtracted therefrom. The coincidence logic 620 receives $I_A' RB$ and $I_A' RB - V_A$ and provides the appropriate output.

Figure 7:
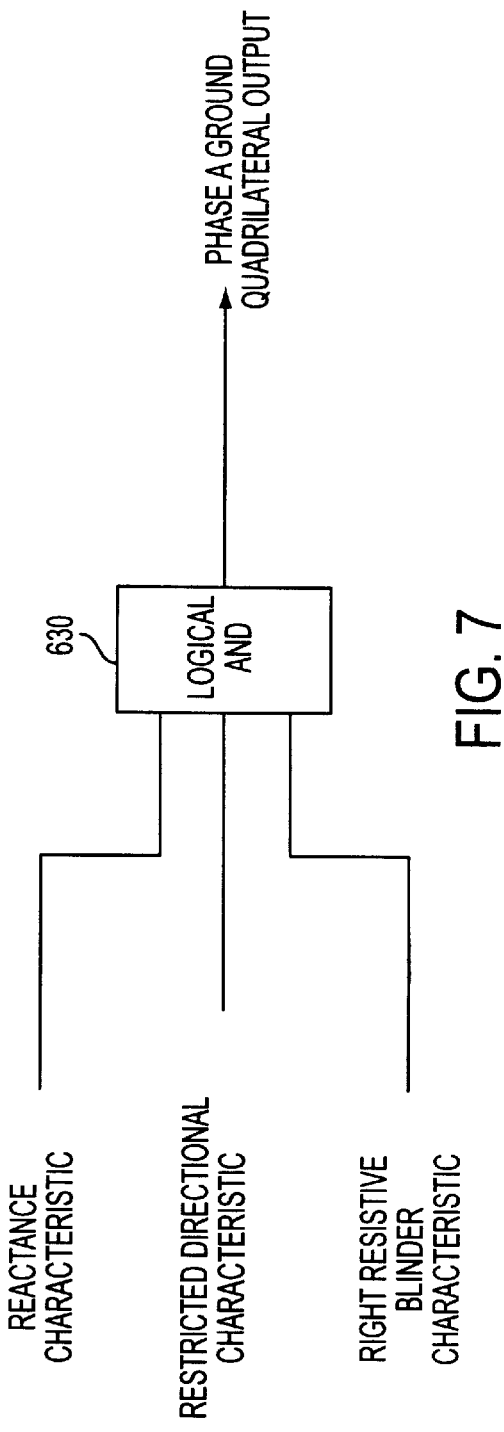

In FIG. 7 each of the characteristics are logically ANDed together in block 630. An output from block 630 indicates that a phase A (in the embodiment shown) to ground fault, only, has occurred within the definition of the quadrilateral characteristic. This signal would, in a more comprehensive implementation, be used to trip a circuit breaker or the like.

In summary, by implementing the described combination of phase selectors for the reactance characteristic in a ground distance quadrilateral characteristic a more discriminating quadrilateral characteristic is obtained. Specifically, the ground distance relay as described herein effectively eliminates undesirable electrical transmission interruptions by avoiding operation upon a double line to ground fault.

While the invention has been described with reference to a preferred embodiment, it will be understood by those skilled in the art that various changes may be made and that equivalents may be substituted for elements thereof without departing from the scope thereof In addition, many modifications may be made to adapt a particular situation or material to the teachings herein without departing from the essential scope thereof Therefore, it is intended that the invention not be limited to the particular embodiment disclosed as the best mode contemplated for carrying out this invention, but that the invention will include all embodiments falling within the scope of the appended claims.

Figure 4:
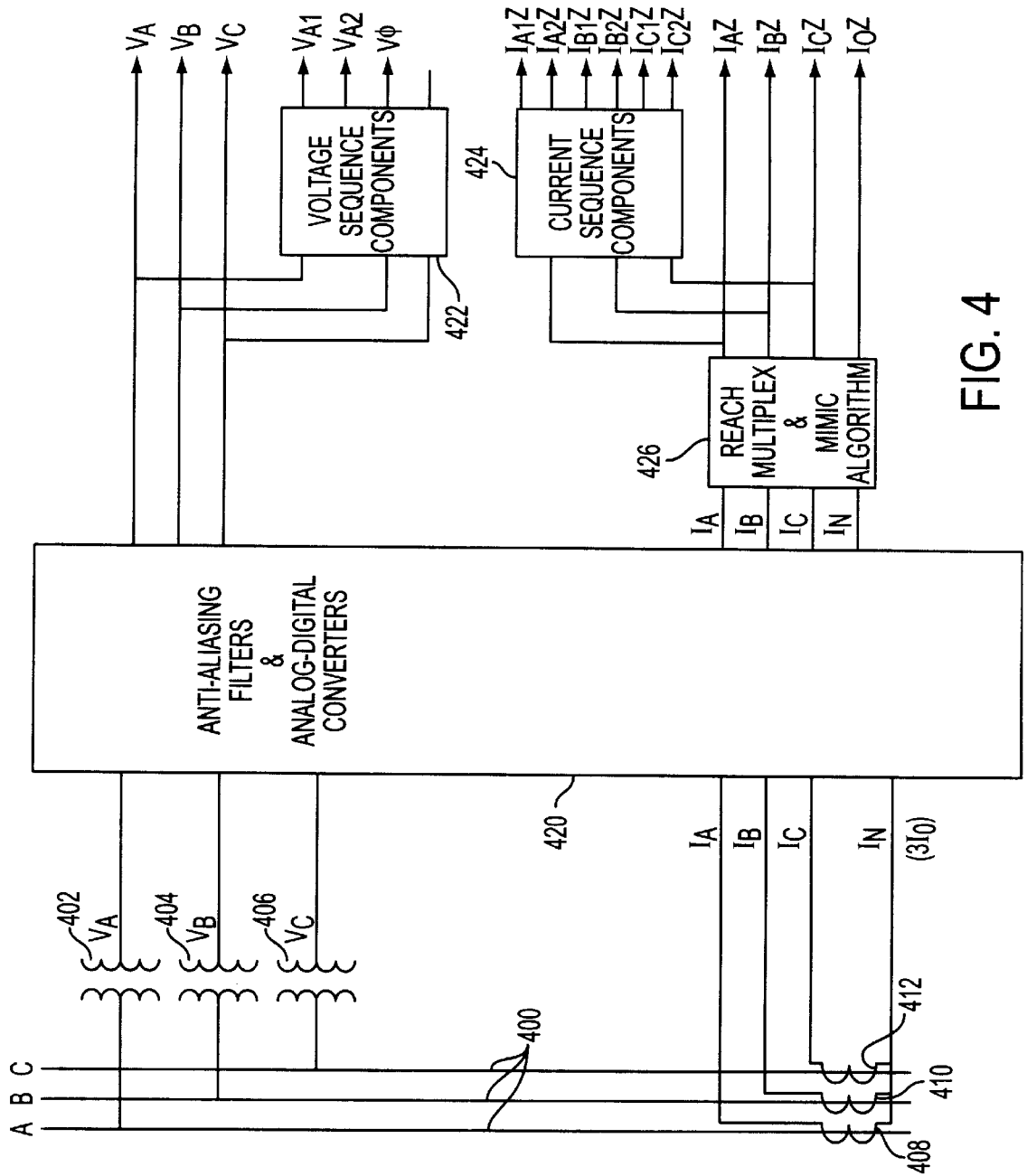

As previously discussed, FIGS. 4–7 depict the preferred implementation for achieving the ground distance relay described herein. Specifically, a means for generating a quadrilateral reactance characteristic includes operate signal calculation block 500, memory filter 510, summing block 520 and coincidence logic 530. Appropriate input signals to these components can be obtained as shown in FIG. 4 or by any other suitable means. Similarly, a means for obtaining a quadrilateral restricted directional characteristic in accordance with the preferred embodiments of the present invention includes components 540 and 550 also shown in FIG. 5 along with the appropriate input as shown. Likewise, a means for obtaining the right resistive blinder characteristic for the quadrilateral characteristic as described herein is shown in FIG. 6 with components 600, 610 and 620. Of course, any other suitable means for obtaining the various discrete characteristics described herein is within the scope of the present invention.

What is claimed is:

1. A protective relay for protecting a phase of a polyphase electric power transmission system by generating a tripping signal in response to a fault between said phase and a ground, comprising:

means for generating in respect to said phase of said polyphase system a quadrilateral reactance characteristic;

means for generating in respect to said phase of said polyphase system a quadrilateral restrictive directional characteristic; and means for generating in respect to said phase of said polyphase system a quadrilateral resistive blinder characteristic, wherein inputs to said means for generating in respect to said phase of said polyphase system a quadrilateral reactance characteristic comprise:

| | |
|---|---|
| Operate: | $I_\phi'Z - V_\phi$ |
| Pol. #1: | $I_0 Z_1$ |
| Pol. #2: | $I_2 Z_1$ |
| Pol. #3: | $I_{1F} Z_1$ |

Where:
$I_\phi'Z$ is the compensated IZ product,
$Z_1$ is the positive sequence replica impedance,
$V_\phi$ is the phase to ground voltage,
$I_0$ is the zero sequence current component,
$I_2$ is the negative sequence current component, referenced to a proper phase, and
$I_{1F}$ is the fault component of the positive sequence current component, referenced to the proper phase, with pre-fault load current removed.

2. The protective relay of claim 1, wherein a characteristic timer for said reactance characteristic is settable with a pickup range of 90 to 155 degrees.

3. The protective relay of claim 2, wherein said characteristic timer induces a tilt in said reactance characteristic.

4. The protective relay of claim 1, wherein said reactance characteristic has two sections, each tilting downward from a maximum reach balance point when plotted on a R-X diagram.

5. The protective relay of claim 1, wherein said protective relay operates upon detection of only said fault between said phase and ground.

6. The protective relay of claim 1, wherein said reactance characteristic incorporates a variable mho function.

7. The protective relay of claim 1, wherein input signals to said means for generating in respect to said phase of said polyphase system a quadrilateral restrictive directional characteristic for said phase of said polyphase system comprise $I_\phi \cdot ZD$ $V_\phi$ where ZD is the angle of maximum torque.

8. The protective relay of claim 7, wherein the angle of maximum torque is about 65 degrees.

9. The protective relay of claim 7, wherein a characteristic timer angle is set to about 115 degrees.

10. The protective relay of claim 1, wherein input signals to said means for generating in respect to said phase of said polyphase system a quadrilateral resistive blinder characteristic comprise:

Operate: $I_\phi' \cdot RB1 - V_\phi$

Polarize: $I_\phi' \cdot RB1$ where the magnitude of RB1, corresponding to a right blinder for a zone 1, is a point at which said resistive blinder characteristic intersects the R axis of a R-X diagram.

11. The protective relay of claim 10, wherein a range of adjustment for said point is about 0.1 to 500.0 ohms.

12. The protective relay of claim 11, wherein an angle of RB1 is fixed based on the positive sequence line angle (POSANG), the zero sequence line angle (ZERANG), and zero-sequence compensation factor (K0) in accordance with the following equation:

$$\text{the angle of } RB1 = \frac{2 \cdot POSANG + K0 \cdot ZERANG}{2 + K0}.$$

13. The protective relay of claim 1, wherein outputs of each of said individual means for generating are connected to an AND gate.

14. The protective relay of claim 1, wherein said individual means for generating comprise a phase comparator.

15. The protective relay of claim 1, wherein Pol.#1, Pol.#2 and Pol.#3 are each polarizing signals input to said means for generating in respect to said phase of said polyphase system a quadrilateral reactance characteristic.

16. The protective relay of claim 1, wherein the compensated $I\phi'$ is calculated by the equation $(I_A - I_0) + K_0 1 \cdot I_0$, where $K_0 1$ is a vector with an angle equal to the zero sequence line angle (ZERANG) minus the positive sequence line angle POSANG).

17. A method of protecting a phase of a polyphase electric power transmission system by generating a tripping signal in response to a fault between said phase and a ground, comprising:

generating in respect to said phase of said polyphase system a quadrilateral reactance characteristic;

generating in respect to said phase of said polyphase system a quadrilateral restrictive directional characteristic; and generating in respect to said phase of said polyphase system a quadrilateral resistive blinder characteristic, wherein said step of generating in respect to said phase of said polyphase system a quadrilateral reactance characteristic comprises operating on the following set of signals:

| | |
|---|---|
| Operate: | $I_\phi'Z - V_\phi$ |
| Pol. #1: | $I_0 Z_1$ |
| Pol. #2: | $I_2 Z_1$ |
| Pol. #3: | $I_{1F} Z_1$ |

Where:
$I_\phi'Z$ is the compensated IZ product,
$Z_1$ is the positive sequence replica impedance,
$V_\phi$ is the phase to ground voltage,
$I_0$ is the zero sequence current component,
$I_2$ is the negative sequence current component, referenced to a proper phase, and
$I_{1F}$ is the fault component of the positive sequence current component, referenced to the proper phase, with pre-fault load current removed.

18. The method of claim 17, further comprising setting a characteristic timer for said reactance characteristic with a pickup range of 90 to 155 degrees.

19. The method of claim 18, wherein said characteristic timer induces a tilt in said reactance characteristic.

20. The method of claim 17, wherein said reactance characteristic has two sections, each tilting downward from a maximum reach balance point when plotted on a R-X diagram.

21. The method claim 17, further comprising generating said tripping signal upon detection of only said fault between said phase and ground.

22. The method of claim 17, wherein said reactance characteristic incorporates a variable mho function.

23. The method of claim 17, wherein said step of generating in respect to said phase of said polyphase system a quadrilateral restrictive directional characteristic for said phase of said polyphase system operates on the following signals:

$I_\phi \cdot ZD$
$V_\phi$ where ZD is the angle of maximum torque.

24. The method of claim 23, further comprising setting the angle of maximum torque to about 65 degrees.

25. The method of claim 23, further comprising setting a characteristic timer angle to about 115 degrees.

26. The method of claim 17, wherein said step of generating in respect to said phase of said polyphase system a quadrilateral resistive blinder characteristic comprises operating on the following signals:
Operate: $I_\phi' \cdot RB1 - V_\phi$
Polarize: $I_\phi' \cdot RB1$
where the magnitude of RB1, corresponding to a right blinder for a zone 1, is a point at which said resistive blinder characteristic intersects the R axis of a R-X diagram.

27. The method of claim 26, further comprising setting a range of adjustment for said point to about 0.1 to 500.0 ohms.

28. The method of claim 27, further comprising fixing an angle of RB1 based on the positive sequence line angle (POSANG), the zero sequence line angle (ZERANG), and a zero-sequence compensation factor (K0) in accordance with the following equation:

$$\text{the angle of } RB1 = \frac{2 \cdot POSANG + K0 \cdot ZERANG}{2 + K0}.$$

29. The method of claim 17, further comprising ANDing together results of said individual steps of generating.

30. A protective relay, comprising:

an A-D converter for converting signals representative of voltage and current of a phase of a transmission line;

a voltage sequence generator connected to said A-D converter;

a reach multiplier and mimic generator connected to said A-D converter and a current sequence generator connected to an output of said reach multiplier and mimic generator;

an operate signal calculator receiving as inputs output signals from each of the voltage sequence generator, the reach multiplier and mimic generator and the current sequence generator; and coincidence logic, for outputting a quadrilateral reactance characteristic, having a first input connected to said operate signal calculator and a second input receiving a polarizing signal proportional to a fault component of a positive sequence current component referenced to a proper phase with pre-fault load current removed.

31. The protective relay of claim 30, further comprising means for generating a restricted directional characteristic and means for generating a right resistive blinder characteristic.

32. The protective relay of claim 31, further comprising an AND gate connected to said coincidence logic, said means for generating a restricted directional characteristic and said means for generating a right resistive blinder characteristic, an output of said AND gate being indicative of the presence of a single phase to ground fault.

33. The protective relay of claim 31, wherein said means for generating a restricted directional characteristic and said means for generating a right resistive blinder characteristic comprise a second coincidence logic.

34. The protective relay of claim 30, further comprising a memory filter.

* * * * *